UNITED STATES PATENT OFFICE.

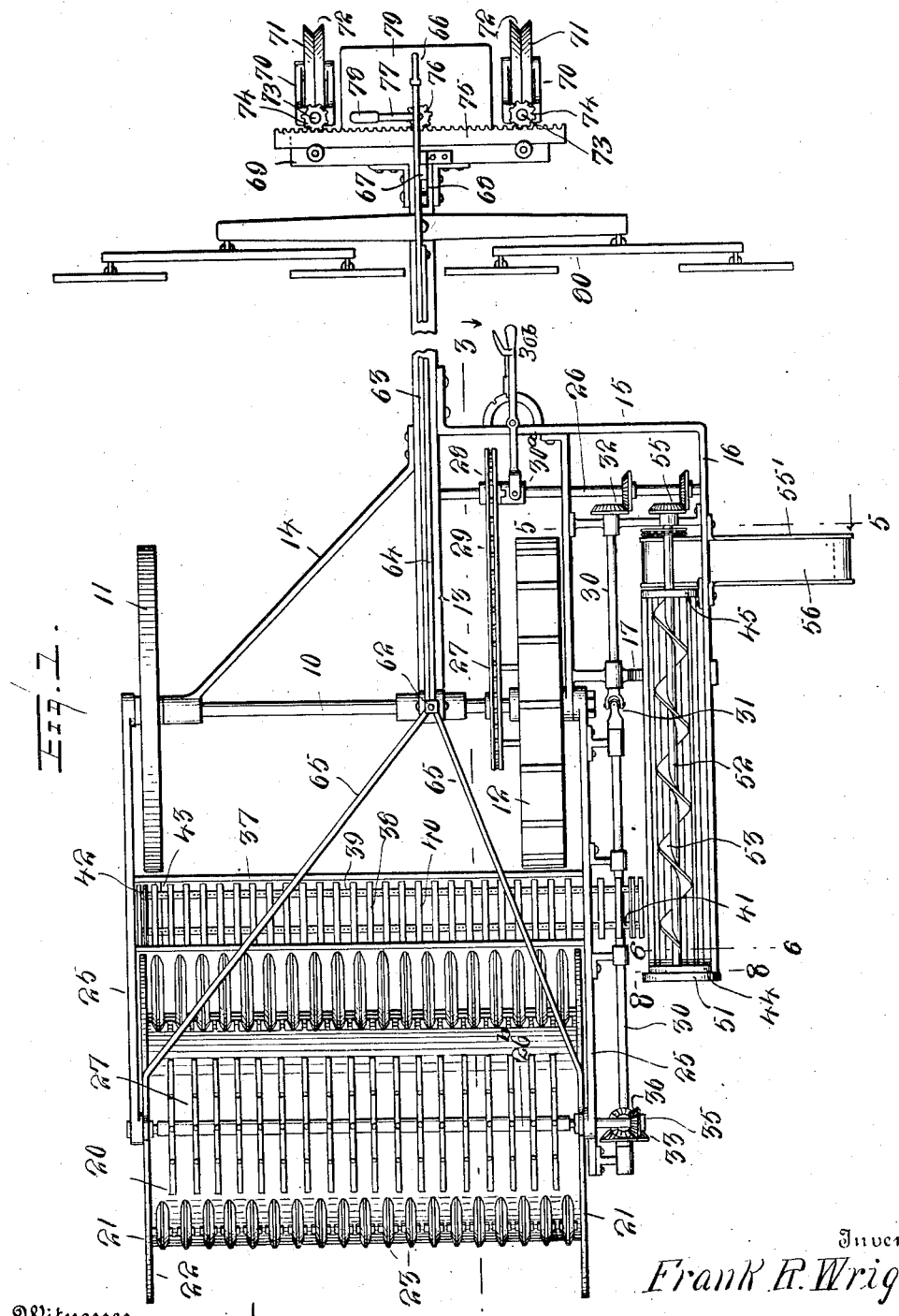

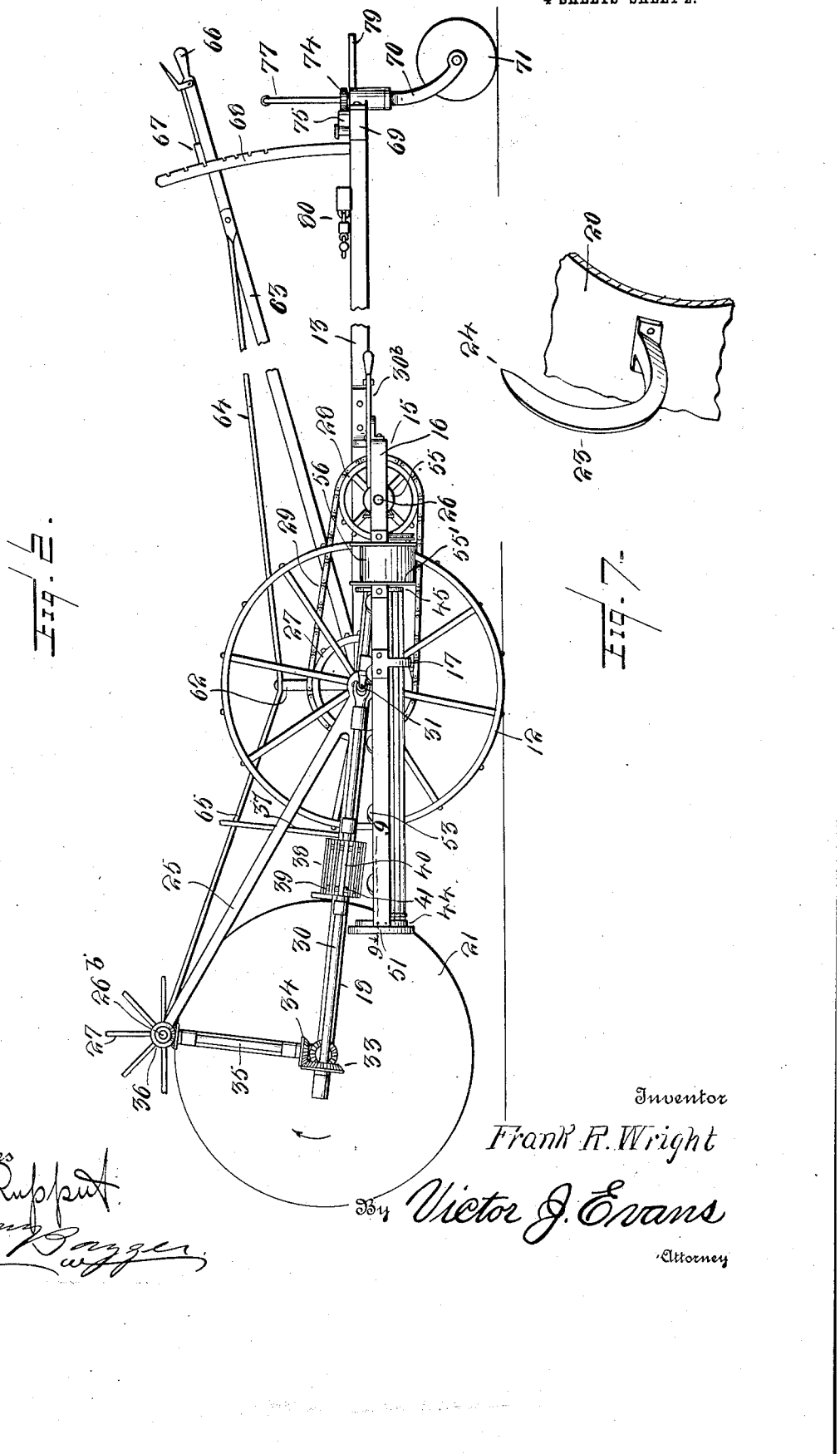

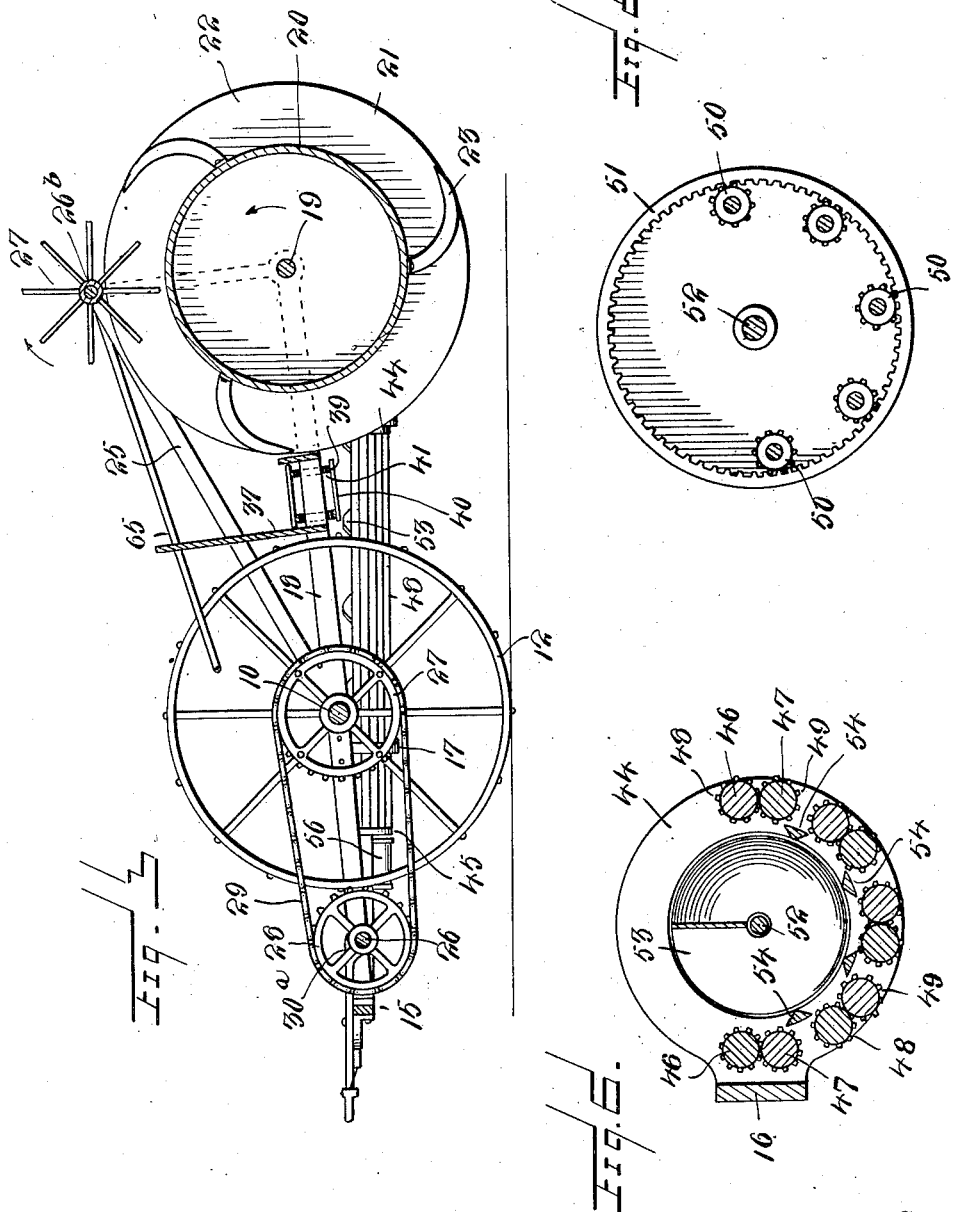

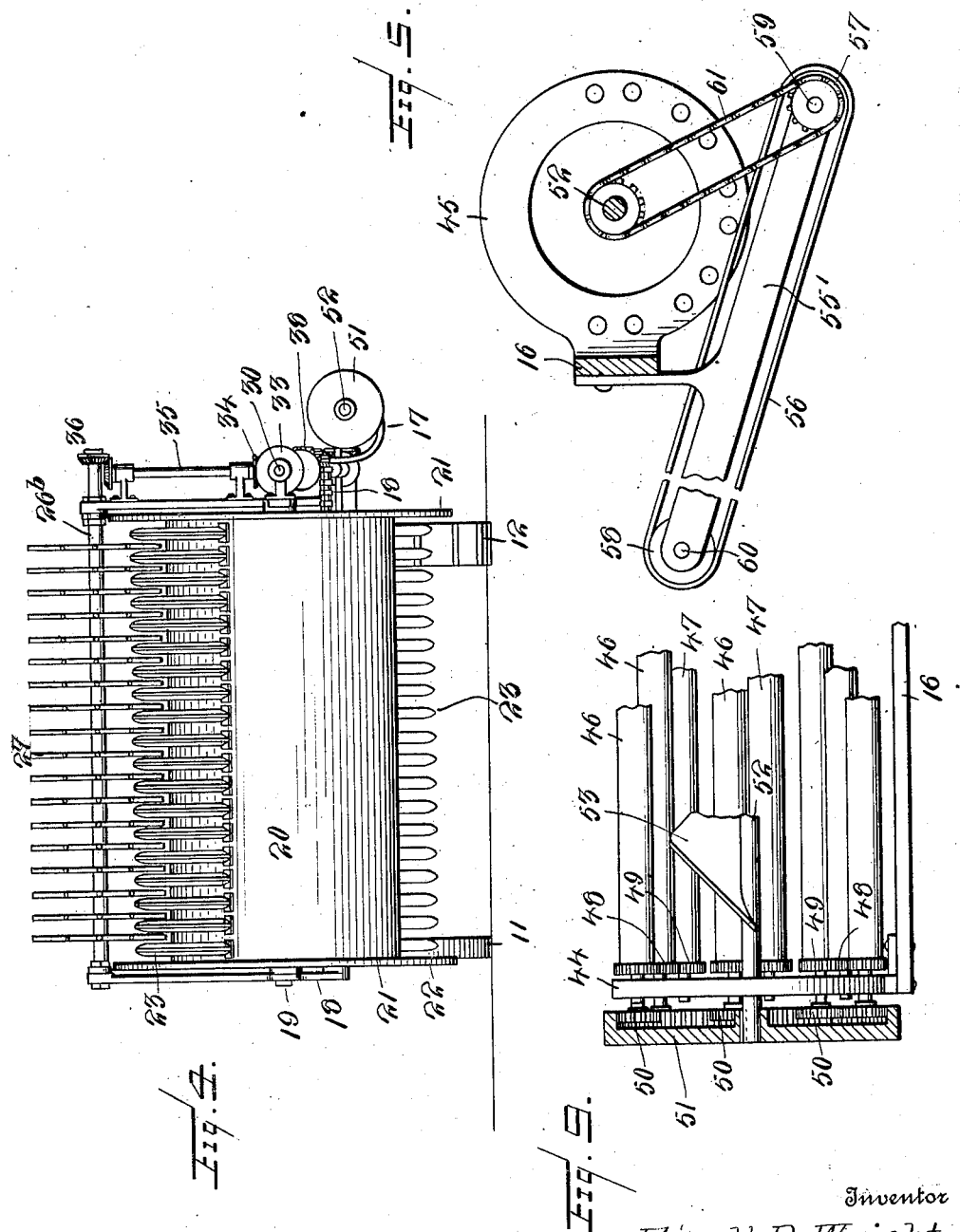

FRANK R. WRIGHT, OF WINFRED, SOUTH DAKOTA.

CORN-HARVESTER.

1,113,857. Specification of Letters Patent. Patented Oct. 13, 1914.

Application filed June 1, 1912. Serial No. 701,000.

*To all whom it may concern:*

Be it known that I, FRANK R. WRIGHT, a citizen of the United States, residing at Winfred, in the county of Lake and State of South Dakota, have invented new and useful Improvements in Corn-Harvesters, of which the following is a specification.

This invention relates to corn harvesters of that class in which there is embodied in an organized machine mechanism for picking or detaching ears from the stalks; mechanism for stripping the husks from the ears; means for conveying the ears from the picking device to the stripping or husking device, and means for conveying the husked ears from the husking device to the receptacle, such as the box of a wagon traveling alongside the harvester.

One object of the invention is to construct a corn harvester adapted to operate on one, two or more rows of corn, according to the dimensions of the picking device and which shall be simple in construction and easily operated.

A further object of the invention is to simplify and improve the construction of the picking mechanism for detaching the ears from the stalks.

A further object of the invention is to produce a picking mechanism of simple construction which may be easily and effectively raised or lowered so as to operate with equal efficiency on corn having stalks of different length as well as on down corn.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a corn harvester constructed in accordance with the invention. Fig. 2 is a side elevation of the same. Fig. 3 is a longitudinal sectional view taken on the line 3—3 in Fig. 1. Fig. 4 is a front elevation. Fig. 5 is a transverse section detail view, enlarged, taken on the line 5—5 in Fig. 1. Fig. 6 is a transverse sectional detail view, enlarged, taken on the line 6—6 in Fig. 1. Fig. 7 is a perspective detail view of a portion of the picker drum, showing one of the picker teeth attached thereto. Fig. 8 is a sectional detail view, enlarged, taken on the line 8—8 in Fig. 1. Fig. 9 is a sectional detail view, enlarged, taken on the line 9—9 in Fig. 2.

Corresponding parts in the several figures are denoted by like characters of reference.

The axle 10 of the machine is supported on a transporting wheel 11 and a bull wheel 12, both of which are mounted for rotation on the axle, and said axle also supports the front end of the push tongue 13, which latter is reinforced by a brace 14. The main frame of the machine includes in addition to the axle, the tongue and brace 14, the rear member 15, one end of which is connected with the tongue from which it extends laterally behind the bull wheel, a side bar 16 extending forwardly from the rear bar 15, and a yoke or brace 17 connecting the side bar 16 with the axle.

Pivotally connected with the axle 10 are two arms 18 constituting the side members of an adjustable frame, said side members supporting at their forward ends, which extend a considerable distance forwardly of the main frame, a shaft 19 carrying the picker drum 20, the latter consisting of a sheet metal drum of suitable dimensions, the length of said drum being sufficient to enable it to engage as many rows of corn as it may be desired to operate upon. The ends of the drum are provided with heads 21 which are of a diameter considerably exceeding that of the body of the drum beyond which said heads project to form flanges 22 whereby ears of corn will be prevented from dropping at either end. The drum is equipped with several rows or series of picker teeth 23 which are bolted or otherwise secured thereon, said teeth consisting, as will be best seen in Fig. 7, of hook-shaped members which on the front or upgoing side of the drum are curved outwardly and upwardly from said drum, so that said picker teeth will serve to engage stalks of corn whether such stalks be down or standing. The inner faces of the picker teeth which are opposed to the face of the drum are relatively wide, and said teeth taper to a relatively sharp outer edge. The teeth are placed sufficiently close together, say at intervals of one-half inch, to permit the corn stalks to pass therebetween, while the ears will be stripped from the stalks by the action of said teeth. The free ends of the teeth are tapered to form blunt points 24 which will enable the stalks to be readily guided between said teeth. It will also be seen that each row of teeth constitutes a trough or holder, closed or obstructed at the ends by the flanges 22 formed by the heads of the drum, wherein the ears that are detached from the stalks will be conveyed upwardly and rearwardly over the drum and be dumped or discharged in rear of the drum into a conveyer which is provided to receive the ears, as will be presently described.

The side members 18 of the movable frame are reinforced by braces 25 which coöperate with said side members to afford bearings for a shaft 26$^b$ which is supported a suitable distance above the drum carrying shaft 19 and which is provided with radially extending arms 27 adapted to operate between the picker teeth and constituting beaters whereby the ears that are detached from the stalks by the action of the picker teeth will be thrown in a rearward direction and into a conveyer trough provided for the reception of said ears, as will be presently described. It is obvious that the picker drum and the beater shaft may be operated at any desired relative speed that may be found most suitable, but it may be suggested, however, that in practice the beater shaft should be preferably operated at a speed considerably exceeding that of the picker drum. It is also obvious that the direction of rotation shall be so arranged that while the picker teeth on the front side of the drum move upwardly, the arms or beaters on the forward side of the beater shaft move in a downward direction to act effectively on the ears of corn detached from the stalks by the picker teeth. It is further obvious that the beater arms should be of suitable length to insure effective operation.

Supported for rotation in suitable bearings in rear of the bull wheel is the main driving shaft 26 which receives motion from the bull wheel by means including a sprocket wheel 27 associated with said bull wheel, a sprocket wheel 28 which is loosely mounted on the shaft 26, a chain or link belt 29 and a clutch 30$^a$, whereby the sprocket wheel 28 may be locked on the shaft 26 for the purpose of driving the latter, while by disengaging said clutch, the sprocket wheel 28 will be permitted to revolve idly on the shaft 26, thereby throwing out of operation the parts driven by said shaft. For the purpose of actuating the clutch 30$^a$, a suitable lever is to be provided, an ordinary hand lever 30$^b$ having been shown for this purpose, but it is obvious that the lever for actuating the clutch may be of any desired character and also that it may be located in a position convenient to the operator to enable the clutch to be thrown by the operator without leaving his station.

30 designates a longitudinal shaft supported in suitable bearings alongside of the side members 18 of the movable frame, said shaft including a knuckle joint 31 which is in alinement with the axis about which the side members 18 are arranged to swing. Said shaft is driven by means of bevel gearing 32 from the shaft 26. The forward end of the shaft 30′ transmits motion by bevel gearing 33 to the drum carrying shaft 19, and said shaft also transmits motion by bevel gearing 34 to a shaft 35 which is connected by bevel gearing 36 with the cleaner shaft 26 which is thereby rotated in the proper direction. It will be observed that the picker drum is supported by the moving frame 18 a suitable distance in advance of the main frame so that no part of said main frame or of the running gear or other accessories will at any time be able to obstruct the forward or upgoing portion of the picker drum.

Supported on the side members 18 of the movable frame in rear of the picker drum or cylinder is a trough 37 over which an endless conveyer 38 is guided, said conveyer being composed of chains 39 connected at intervals by slats or cross bars 40, said chains being guided at one end of the trough 37 over sprockets 41 on the shaft 30 and at the opposite end of said trough over sprockets 42 rotating idly on a supporting shaft 43. The conveyer operating in the trough 37 will be driven from the shaft 30 which transmits motion to the picker drum and related parts and the conveyer trough will constantly occupy a proper position relatively to the picker drum, being supported on the movable frame which also supports the said drum.

The main frame of the machine includes a pair of arcuate brackets 44, 45, one in front and the other in rear of the discharge end of the conveyer 38 which discharges over the shaft 30. The brackets 44, 45 afford bearings for the journals of the husking rolls 46, 47 which are arranged in pairs, and the several pairs of rolls are disposed in approximately semi-circular series so as to coöperate to form a trough. The husking rolls of each pair are provided with interengaging pinions 48, 49, and the journal at the forward end of one of each pair of rolls carries a pinion 50. The pinions 50 are all in mesh with the teeth of an internal gear 51 which is supported for rotation on a shaft 52 that extends in parallel relation to the husking rolls and equidistantly from the axes of said rolls, thus occupying an axial position in the trough formed by said husking rolls. The shaft 52 carries a spiral conveyer or auger 53 which extends the full length of the trough formed by the husking rolls so as to convey ears of corn longitudinally through said trough to be operated upon by the rolls. Suitably supported V-shaped guides or deflectors 54 are arranged within the trough wherever needed for the purpose of deflecting ears of corn in the direction of the husking rolls. The shaft 52 is connected by bevel gearing 55 with the main driving shaft 26 from which it derives motion.

It will be seen that by the rotation of the shaft 52 the internal gear 51 carried by said shaft will drive one of each pair of husking rolls, the mating rolls being driven by the intermeshing pinions 48, 49, thus causing the rolls to rotate in opposite directions for the purpose of detaching the husks from the ears of corn in a manner which is well understood. The ears are delivered into the husking trough formed by the husking rolls over the discharge end of the conveyer 38, and the ears are carried through the husking trough by the action of the spiral conveyer 53, owing to the presence of which it is regarded as immaterial whether the husking rolls are arranged in a true horizontal position, or otherwise.

The husked ears are discharged over the rear ends of the husking rolls into an elevator including a trough or casing 55' which is suitably supported on the main frame of the machine, the receiving end of said elevator being disposed beneath the discharge end of the husking trough. The elevator casing contains an endless conveyer 56 which is guided over sprockets 57, 58 on shafts 59, 60 at the lower and upper ends of the elevator casing, the shaft 59 at the lower end of said casing being driven by means of a chain or link belt 61 from the shaft 52.

The main frame of the machine supports a pivoted post or upright 62 constituting one arm of a bell crank, the other arm of which is formed by a rearwardly extending rod 63, the rear end of which is connected with the upper end of the post 62 by a brace 64. The bell crank formed by the arms 62, 63 constitutes an adjusting lever for the movable frame that supports the picker drum, the cleaner and the conveyer trough 37, the upper end of the post or arm 62 being connected with the upper forward portion of the movable frame by means of links 65. It will be seen that by manipulating the adjusting lever the forward end of the frame carrying the picking drum and related parts may be raised or lowered so as to operate with equal efficiency on down corn and on stalks of various lengths that are standing upright. The rear end of the arm 63 of the adjusting lever has a handle 66 and a stop member 67 engaging a rack bar 68 whereby the adjusting lever and the parts controlled thereby may be securely retained at various adjustments.

The rear end of the tongue 13 is supported on a truck including a cross bar 69 having pivoted forks 70 wherein caster wheels 71 are supported for rotation, said caster wheels being preferably provided with annular V-shaped grooves 72 to prevent skidding. The shanks 73 of the forks 70 are provided with pinions 74 engaging a rack bar 75 which is slidably supported on the cross bar 69 and which is also in mesh with a pinion 76 on a steering post 77 having a handle 78, whereby it may be conveniently manipulated to simultaneously actuate the wheel carrying forks for the purpose of steering the machine. A platform 79 for the operator is supported on the cross bar 69. An evener 80 of ordinary construction has been shown mounted upon the tongue for the attachment of draft.

From the foregoing description, taken in connection with the drawings hereto annexed, the operation and advantages of this invention will be readily understood by those skilled in the art to which it appertains. The machine will operate with equal efficiency lengthwise or transversely of the rows of corn, and it may, therefore, be driven in a circuit around the field without necessity for making a complete turn at the ends of the rows. When the machine is traveling over the field, the picker drum will be driven or rotated, causing the picker teeth to engage the corn stalks and to strip the ears therefrom, the ears being discharged over the drum and into the conveyer trough 37 whence they are carried by the endless conveyer 38 to the forward end of the husking trough. The ears are conveyed in a rearward direction through the husking trough by the spiral conveyer or auger 53, and the ears will be thus turned over and agitated, causing the husks to be seized and stripped from the ears by the action of the coacting rolls. The ears, denuded of the husks, are discharged over the rear end of the conveyer trough into the elevator casing and are conveyed through the latter by the endless conveyer 56 to a suitable receptacle, such as the box of a wagon driven alongside of the machine.

It will be readily understood that the machine by varying the width thereof and the length of the picker cylinder may be constructed to operate simultaneously upon as many rows of corn as may be desired. The construction is also of such a nature that it will be practically impossible for an ear of corn to escape being stripped by the picker fingers and gathered by the machine. The general construction is simple and of such a nature that the working parts are easily accessible for inspection and repairs. The machine may be driven with relatively slight expenditure of power, and it will be found efficient as a time and labor saving device.

Having thus described the invention, what is claimed as new, is:—

1. In a corn harvester, a picker drum supported for rotation and having stalk engaging teeth, means for rotating the drum to move the forward portion thereof upwardly, a beating device including a rotating shaft and arms radiating from said shaft and engaging the spaces between the picker teeth, said beating device being supported above the picker drum, and means for driving the cleaning device to move the forward portion thereof in a downward direction.

2. In a corn harvester, a picker drum supported for rotation, means for driving the drum to move the forward portion thereof in an upward direction, stalk engaging teeth on said drum, said teeth being curved and provided with flat inner surfaces facing the drum, a shaft supported for rotation and in parallel relation to the axis of the picker drum, arms radiating from said shaft and engaging the spaces intermediate the picker teeth, and means for transmitting motion from the drum to the shaft having the radial arms to move the latter forwardly and downwardly.

3. In a corn harvester, a main carrying frame, an auxiliary frame pivoted thereon and including arms constituting side members, a picker drum supported on the auxiliary frame and having rows of spaced picker teeth, a trough supported on the side members of the auxiliary frame in rear of the picker drum, an endless conveyer in said trough, supporting means for the endless conveyer including shafts having sprockets, bevel gearing connecting one of said shafts with the picker drum to rotate the latter, and means for driving said shaft to actuate the picker drum and the conveyer.

4. In a corn harvester, a main carrying frame, an auxiliary frame pivoted thereon, rotary supporting means for the main frame including a bull wheel, a main driving shaft supported on the main frame in rear of the bull wheel, means including a clutch transmitting motion to said shaft from the bull wheel, a picker drum and a conveyer supported on the auxiliary frame, means for driving said picker drum and conveyer including a shaft having a knuckle joint, means for transmitting motion to said shaft from the main driven shaft, a beating device supported on the auxiliary frame above the picker drum, and means for transmitting motion to the beating device from the picker drum.

5. In a corn harvester, a main carrying frame, an auxiliary frame pivoted thereon, a picker drum, a beating device and a conveyer supported on the auxiliary frame, means for adjusting the auxiliary frame and for supporting it at various adjustments, rotary supporting means for the main frame including a bull wheel, a main driven shaft supported for rotation on the main frame and deriving motion from the bull wheel, a longitudinally disposed husking trough comprising a plurality of pairs of husking rolls arranged in approximately semi-circular series and supported on the main frame adjacent to the auxiliary frame, means for driving the picker drum and the conveyer including a shaft having a knuckle joint and bevel gearing connecting said shaft with the main driven shaft, means for transmitting motion from the picker drum to the cleaning device, an operating shaft extending axially through the husking trough, means including an internal gear carried by said shaft for transmitting motion therefrom to the rolls constituting the trough, a spiral conveyer on said axial shaft, an elevator including an endless conveyer supported to receive husked ears discharged over the tail end of the husking trough, means for transmitting motion to said conveyer from the shaft extending axially through the husking trough, and means for driving said shaft consisting of intermeshing bevel gears mounted respectively on said shaft and on the main driven shaft.

In testimony whereof I affix my signature in presence of two witnesses.

FRANK R. WRIGHT.

Witnesses:
 ANDREW L. BOYD,
 JOHN GILBERTSON.

Copies of this patent may be obtained for five cents each, by addressing the "Commissioner of Patents, Washington, D. C."